(12) United States Patent
Altmanshofer et al.

(10) Patent No.: US 6,987,583 B1
(45) Date of Patent: Jan. 17, 2006

(54) COLOR DIFFERENCE HUE CONTROL SYSTEM

(75) Inventors: Robert Dale Altmanshofer, Carmel, IN (US); William Adamson Lagoni, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 0 days.

(21) Appl. No.: 09/582,381

(22) PCT Filed: Dec. 29, 1997

(86) PCT No.: PCT/US97/24211

§ 371 (c)(1),
(2), (4) Date: Nov. 13, 2000

(87) PCT Pub. No.: WO99/34610

PCT Pub. Date: Jul. 8, 1999

(51) Int. Cl.
*G06F 15/00* (2006.01)
*G03F 3/08* (2006.01)
*H04N 9/64* (2006.01)

(52) U.S. Cl. .................. 358/1.9; 358/520; 348/649
(58) Field of Classification Search ............... 358/1.9, 358/520, 518, 504; 382/167; 348/587, 592, 348/649, 652, 654, 650, 603
See application file for complete search history.

(56) References Cited

U.S. PATENT DOCUMENTS

| | | | | |
|---|---|---|---|---|
| 3,662,097 A | * | 5/1972 | Rennick | 348/652 |
| 3,717,727 A | * | 2/1973 | Davidse et al. | 348/30 |
| 3,873,760 A | * | 3/1975 | Worden | 348/652 |
| 4,048,652 A | * | 9/1977 | Rzeszewski | 348/653 |
| 4,123,774 A | * | 10/1978 | Hjortzberg | 386/13 |
| 4,206,473 A | * | 6/1980 | Isono et al. | 348/605 |
| 4,266,241 A | * | 5/1981 | Hjortzberg | 386/16 |
| 4,679,072 A | | 7/1987 | Takayama | |
| 4,737,842 A | * | 4/1988 | Nagasaki | 348/30 |
| 4,953,011 A | | 8/1990 | Mori et al. | |

(Continued)

FOREIGN PATENT DOCUMENTS

DE 3545113 7/1986

(Continued)

*Primary Examiner*—Madeleine Nguyen
(74) *Attorney, Agent, or Firm*—Joseph S. Tripoli; Robert D. Shedd; William A. Lagoni

(57) ABSTRACT

A color television receiver system processes color difference signals for providing tint control while maintaining uniform color amplitude with respect to changes in hue shift angle. The color difference signals are modified as a function of each other and as a function of a hue shift angle to produce modified color difference signals. A color difference signal [B-Y] is supplied as a first input to multipliers M1 and M3. Another color difference signal [R-Y] is supplied as a first input to another pair of multipliers M2 and M4. A control signal generator produces output signals sin θ and cos θ where θ is the hue shift angle. The sin θ signal is supplied as a second input to multipliers M1 and M4 while the cos θ signal is supplied as a second input to multipliers M2 and M3. The outputs of M1 and M2 are added in an adder A1 to produce a modified output [R-Y]'. Similarly, the output of multiplier M3 is provided as a positive input to adder A2 whereas the output of multiplier M4 is provided as a negative input to adder A2 to produce a modified color difference signal [B-Y]'. The modified color difference signals [R-Y]' and [B-Y]' represent a color vector having an amplitude A that remains substantially constant over a relatively wide range of hue shift angles θ.

8 Claims, 4 Drawing Sheets

U.S. PATENT DOCUMENTS

| | | | |
|---|---|---|---|
| 4,954,881 A | * | 9/1990 | Kaye .......................... 348/577 |
| 5,050,188 A | * | 9/1991 | Dirr ........................... 375/260 |
| 5,122,863 A | * | 6/1992 | Zortea ........................ 348/186 |
| 5,289,295 A | * | 2/1994 | Yumiba et al. ........... 358/433.1 |
| 5,357,283 A | * | 10/1994 | Tesler et al. .............. 348/433.1 |
| 5,585,691 A | * | 12/1996 | Washburn ................... 313/452 |
| 5,737,032 A | * | 4/1998 | Stenzel et al. .............. 348/649 |
| 6,211,923 B1 | * | 4/2001 | Desprez-le Goarant ..... 348/654 |
| 6,515,714 B1 | * | 2/2003 | Tachibana ................... 348/654 |
| 6,828,981 B2 | * | 12/2004 | Richardson ................. 345/590 |

FOREIGN PATENT DOCUMENTS

| | | | |
|---|---|---|---|
| DE | 3809967 | | 10/1988 |
| EP | 221254 | | 5/1987 |
| JP | 405030525 A | * | 2/1993 |

* cited by examiner

US 6,987,583 B1

COLOR DIFFERENCE HUE CONTROL SYSTEM

FIELD OF THE INVENTION

The invention relates to control systems for controlling video signal characteristics.

BACKGROUND

In traditional NTSC color television receivers, the television viewer controls the hue of the color by phase shifting the subcarrier reference signals applied to chroma demodulators. This results in a rotation of the "phase plot" of the chroma signal with an attendant hue shift of the demodulated color difference signals. This is illustrated, for example, in FIG. 1 showing the results from rotation of a "phase plot" of a chroma signal with the attendant hue shift of the demodulated color difference signals in the context of a traditional NTSC color television receiver. Several representative colors, namely, red, blue and green, are illustrated in a polar plot. It should be noted that the chroma amplitude represented by the length of the color vectors is substantially unaltered by the hue shift.

The foregoing worked well in the context of traditional NTSC color television receivers, but with advances towards IDTV, EDTV and HDTV as well as evolutions in PAL and SECAM towards customer controls like NTSC products, it becomes desirable to accomplish color (i.e. saturation) and tint (i.e., hue) controls on the base band color difference signals themselves.

The prior art includes a number of efforts to adjust color hue and saturation in a variety of different contexts. One example is described in U.S. Pat. No. 4,788,586 issued on Nov. 29, 1988 to Robert R. Eckenbrecht and entitled "Controller for Adjusting Color Hue and Saturation of Images Generated from Signals in a Non-Broadcasting Video System." Eckenbrecht describes a color tint controller for a closed circuit video system which receives red and blue color difference signals and selectively changes the amplitude of those signals to adjust the color of a displayed image. Other U.S. patents that may be relevant to the adjustment of hue and color saturation include U.S. Pat. Nos. 4,528,586; 4,554,576 and 4,562,460.

Controlling tint by processing color difference signals may cause a problem. Specifically, processing color difference signals for providing tint control over a wide range of hue shift angles may result in undesirable color amplitude variations.

SUMMARY OF THE INVENTION

In accordance with one aspect of the invention, the invention involves providing for selecting a particular hue characteristic within a range of selectable hue characteristics and processing color difference signals for controlling a hue characteristic and a saturation characteristic of a video signal so that the saturation characteristic has a substantially constant amplitude over the range of selectable hue characteristics.

In accordance with another aspect of the invention, color difference signals are modified as a function of each other and as a function of a hue shift angle $\theta$ to produce modified color difference signals representing a color vector whose amplitude stays substantially constant over a relatively wide range of hue shift angles $\theta$.

In accordance with another aspect of the invention, a first color difference signal provides a first input to a first multiplier circuit and to a first input of a third multiplier circuit. A second color difference signal provides a first input to a second multiplier circuit and to a first input of a fourth multiplier circuit. A control signal generator produces a pair of control signals that are each sinusoidal functions of the hue (i.e., tint) shift angle $\theta$. The first control signal is provided as a second input to each of the first and fourth multipliers. The second control signal is provided as a second input to each of the second and third multipliers. Outputs of the first and second multipliers provide a pair of positive inputs to a first adder circuit whose output produces a first modified color difference signal. An output from the third multiplier provides a positive input to a second adder and the output from the fourth multiplier provides a negative input to the second adder. The output of the second adder produces a second modified color difference signal. The first and second modified color difference signals represent a color vector having substantially constant amplitude over a wide range of hue shift angles.

In accordance with another aspect of the invention, the control signal generator includes a lookup table for providing values of the first and second control signals that are a sinusoidal function of the hue shift angle over a wide range of hue shift angles.

In accordance with another aspect of the invention, the control signal generator provides a linear approximation of a sinusoidal function of the hue shift angle for generating the control signal values.

BRIEF DESCRIPTION OF THE DRAWING

The invention will be explained with reference to the drawing in which.

DETAILED DESCRIPTION

During the course of this description, like designations or numbers will be used to identify like elements according to the different figures which illustrate the invention.

Figure 1:
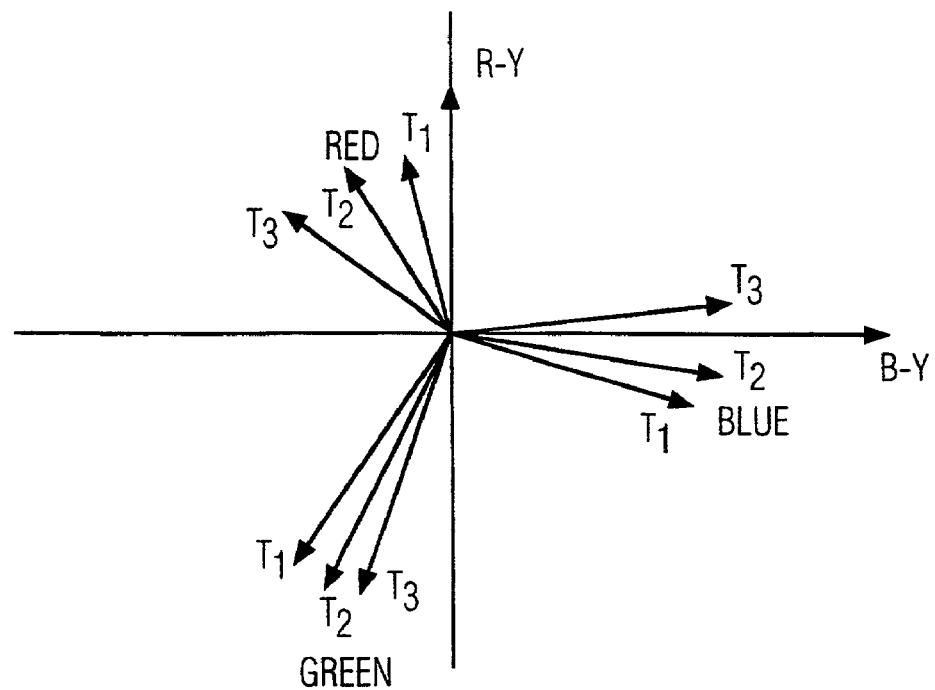
FIG. 1 is a diagram showing the results of the rotation of the phase plot of a modulated chroma signal and the attendant hue shift of the associated demodulated color difference signals in a video signal processing system.
Figure 2:
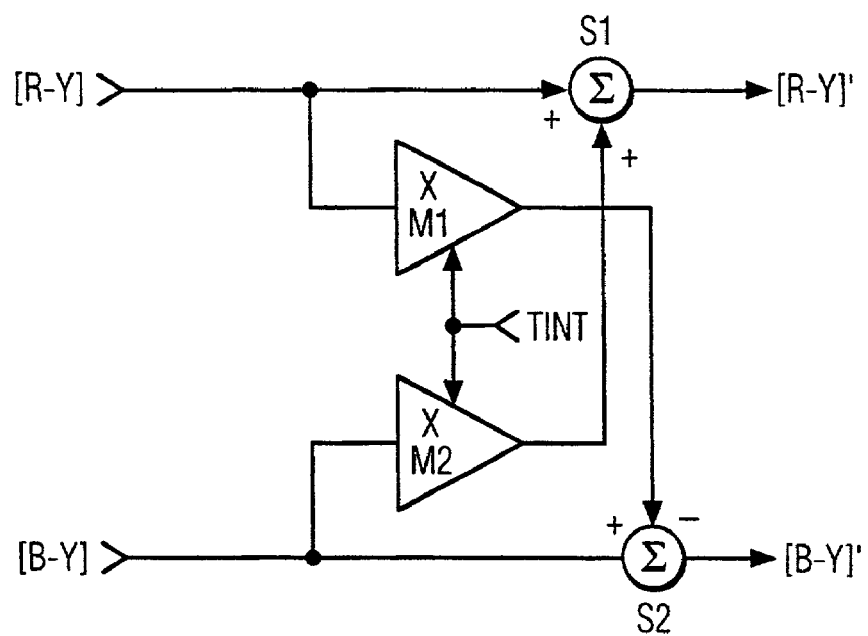
FIG. 2 shows an embodiment of an analog or digital apparatus for modifying color difference signals in such a way that modified color difference signals produced at the output represent a color amplitude that remains relatively constant over a range of hue shift angles.
Figure 3:
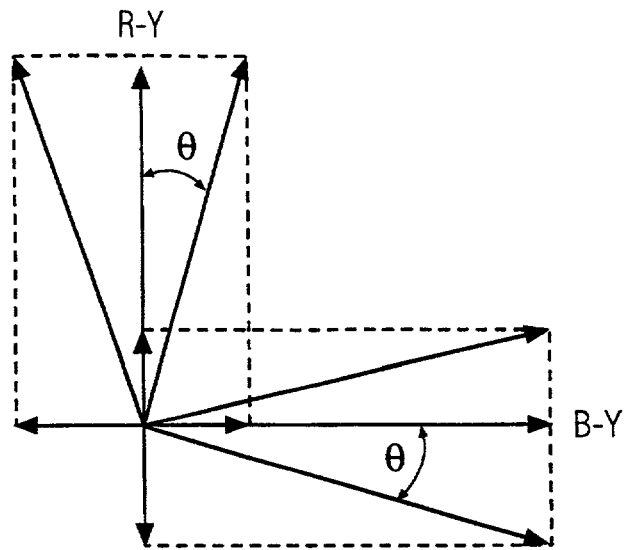
FIG. 3 is a diagram illustrating how the amplitudes of the color vectors remain relatively constant as the hue shift angle $\theta$ varies.

FIG. 2 is a block diagram illustrating an embodiment of a tint control system which operates as shown by the vector plot of FIG. 3.

The system shown in FIGS. 2 and 3 are linear which result in vector summation of the [R-Y] and [B-Y] components. As a result, the amplitude of the resulting output vector, i.e., the color amplitude or saturation characteristic of the color vector, changes as a function of the hue control setting. For a 45° hue shift $\theta$ from nominal, the output amplitude increases approximately 40%. An embodiment providing compensation for this effect is illustrated in the block diagram of FIG. 5. Ideally, it is desirable for the output to remain of constant amplitude versus the hue control voltage. It has been discovered that it is possible to compensate for amplitude changes over a wide range of hue shift angles by controlling the color saturation by coupling the absolute value change of the hue control voltage from nominal into the color control. A detailed explanation of the compensation feature follows.

A color vector V can be defined as:

$$V = A / \theta \quad [\text{5}]$$

having an amplitude (color or saturation) A and a phase (or hue) angle $\theta$.

A phase shifted vector V' having the same amplitude A can be defined as:

$$V' = A / \theta + \theta'$$

where $\theta'$ is the change in phase or hue which would result from a change of the hue control.

In a color difference representation having an [R-Y], [B-Y] coordinate system (X and Y axes, respectively, in the color difference plane), the components of vectors V and V' are then:

$$[R - Y] = A \sin \theta \quad [1]$$

$$[B - Y] = A \cos \theta \quad [2]$$

and $$[R - Y]' = A \sin(\theta + \theta') \quad [3]$$

$$[B - Y]' = A \cos(\theta + \theta') \quad [4]$$

The following identities:

$$\sin(X+Y) = \sin X \cos Y + \cos X \sin Y; \text{ and}$$

$$\cos(X+Y) = \cos X \cos Y - \sin X \sin Y,$$

make it is possible to rewrite [3] and [4] using [1] and [2] as:

$$[B - Y]' = \cos \theta' [B - Y] - \sin \theta' [R - Y] \text{ and} \quad [5]$$

$$[R - Y]' = \sin \theta' [B - Y] + \cos \theta' [R - Y] \quad [6]$$

Equations [5] and [6] represent the [R-Y] and [B-Y] components of a rotated vector V' in the color difference plane having the same amplitude A as the non-rotated vector V. Equations [5] and [6] show that it is possible to keep the amplitude of rotated vector V' constant by multiplying (gain controlling) each of the [R-Y] and [B-Y] color difference components by a value that is a function of the hue shift angle $\theta'$ before combining the [R-Y] and [B-Y] components to produce modified color difference components [R-Y]' and [B-Y]'. The multiplication or gain control factor in equations [5] and [6] is related to the hue shift angle $\theta'$ by a non-linear function, i.e., sinusoidally related to the hue shift angle. That is, the modified color difference signals [R-Y]' and [B-Y]' that represent the shifted vector V' are combinations of the original color difference components [R-Y] and [B-Y] modified by sinusoidal functions of the hue shift angle.

As explained further below, in a digital implementation, a ROM lookup table can be used to implement the sinusoidal functions, i.e., provide sine and cosine values corresponding to each value of $\theta'$. Using precise sine and cosine values from a lookup table permits implementing the ideal relationships set forth in equations [5] and [6]. As a result, it is possible to maintain the amplitude of the rotated vector, i.e., the saturation characteristic, substantially constant over the full range of selectable hue shift values. Alternatively, only a limited range hue shift angles $\theta'$ may be needed. If so, approximations for non-linear functions such as sine and cosine may be used. For example, it is possible to use the following linear approximations for sine and cosine:

$$\cos \theta' \rightarrow 1 - K_2 |\theta'| \text{ and}$$

$$\sin \theta' \rightarrow K_1 \theta'$$

where $K_1$ and $K_2$ are constants. $\theta'$ is now the target phase shift in degrees due to the use of the approximations.

Using these approximations in equations [5] and [6] produces:

$$\overline{[B - Y]}' = (1 - K_2 |\theta'|) [B - Y] - K_1 \theta' [R - Y] \text{ and} \quad [7]$$

$$\overline{[R - Y]}' = K_1 \theta' [B - Y] + (1 - K_2 |\theta'|) [R - Y] \quad [8]$$

where $\overline{[R-Y]}'$ and $\overline{[B-Y]}'$ are approximations of modified color difference components that represent the ideally rotated vector V' having the following amplitude and phase:

$$\overline{A}' = \sqrt{(\overline{[R - Y]}')^2 + (\overline{[B - Y]}')^2} \text{ and} \quad [9]$$

$$\overline{\theta}' = \tan^{-1} \left[ \frac{\overline{[R - Y]}'}{\overline{[B - Y]}'} \right] \quad [10]$$

If $K_2$ is equal to or approaches 0, it can be seen that the relationships in equations [7] and [8] become effectively the same as those implemented by the circuit of FIG. 2.

Figure 5:
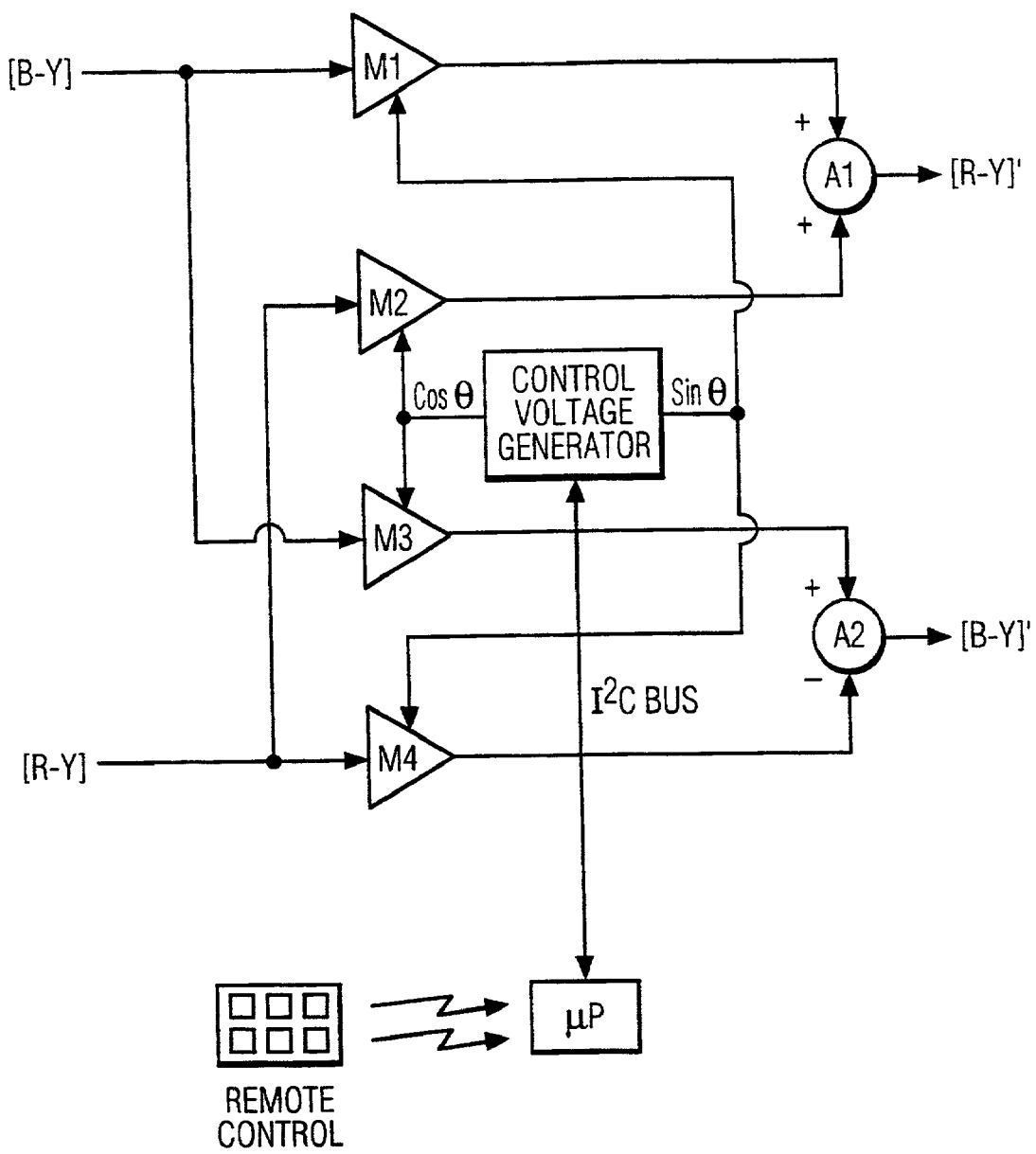
FIG. 5 is a schematic diagram of another embodiment of the invention.
Figure 6:
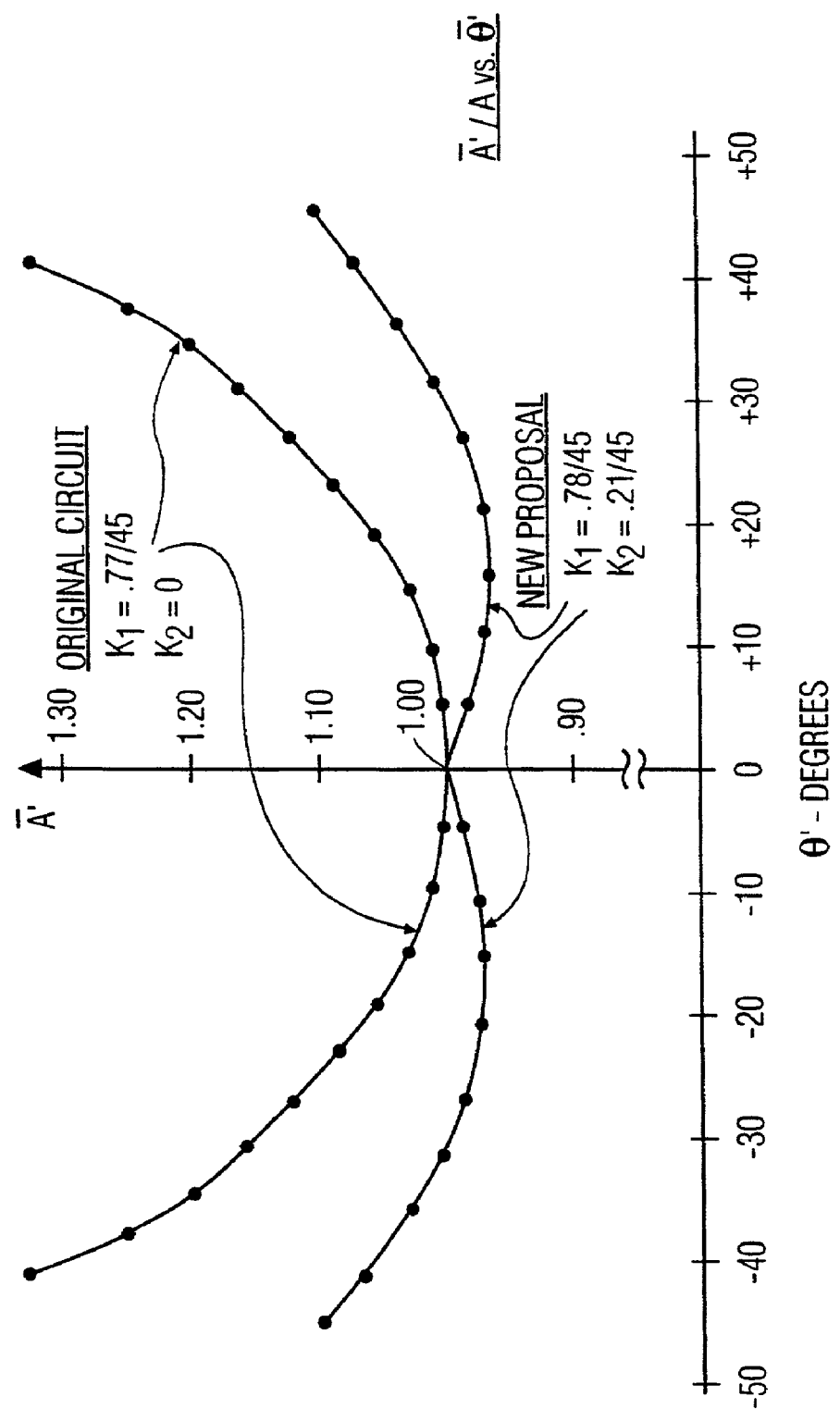
FIG. 6 is a diagram illustrating the manner in which the amplitude A of the color signal can be kept substantially constant over a wide range of hue shift angles.

FIG. 6 illustrates the result of comparing the embodiment of FIG. 2 with the embodiment illustrated in FIG. 5. For the embodiment in FIG. 5, the values for $K_1$ and $K_2$ are:

$$K_1 = 0.78/45 \text{ and } K_2 = 0.21/45$$

for $\theta$ in degrees. As shown in FIG. 6, the embodiment of FIG. 2, where $K_1$ equals 0.77/45 and $K_2$ equals 0, produces a change of approximately 16% in the color amplitude vector when the range of hue shift angles is at ±30°. The embodiment in FIG. 5, however, where $K_1$ equals 0.78/45 and $K_2$ equals 0.21/45, produces an amplitude variation of 3.4% over the same ±30° hue shift angle variation.

The values $K_1$ and $K_2$ are determined empirically using an exemplary computer program written in QBASIC that is shown in Table 1. An example of the optimization procedure performed by the program follows. $K_1$ and $K_2$ in equations [7] and [8] are used in linear approximations of sine and cosine functions. As such, $\theta$ in equations [7] and [8] is only a target for the tint shift. The actual resulting tint shift is given by equation [10]. Solving for $K_1$ and $K_2$ involves first bounding $K_1$ and $K_2$ to some reasonable values. In the program shown in Table 1, certain boundary conditions and iteration step sizes are used, but other values for the boundary conditions and step sizes are possible. Specifically, in the program shown in Table 1, the boundary values used for $K_1$ are 0.5/45 to 0.8/45 and for $K_2$ are 0.1/45 to 0.7/45. The program steps the target tint range of $\theta$ over a broad range of ±75° in 5° steps. For each step, the program loops through possible combinations of $K_1$ and $K_2$ finding the combination which gives the minimum amplitude change across a range which is less than or equal to the desired tint range value (see parameter "TintRangeDesired" in line 250 of the program in Table 1). The program outputs optimum values for $K_1$ and $K_2$.

Figure 4:
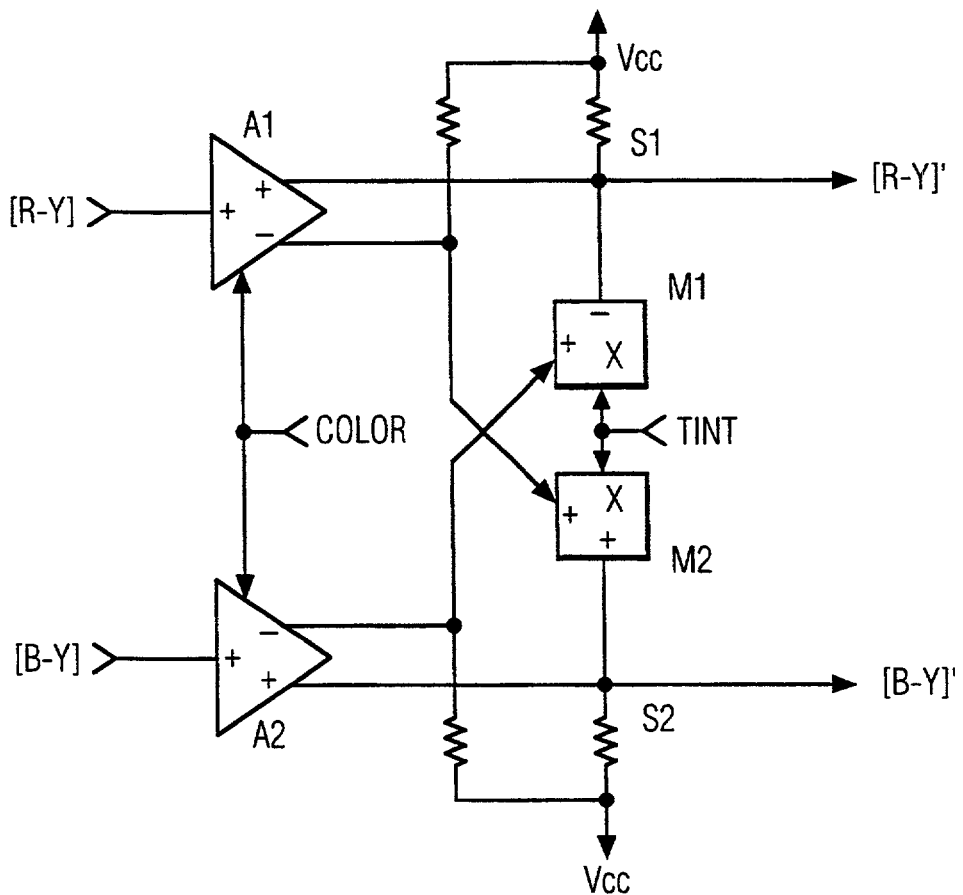
FIG. 4 is a schematic illustration of a second embodiment of the invention.

FIG. 4 illustrates an embodiment of a control system incorporating both color and tint functions. Amplifiers A1 and A2 are gain controlled differential output amplifiers having at least one current source output each. Amplifiers A1 and A2 accomplish the color control (gain) function and by virtue of the current mode outputs which allow summers S1 and S2 to operate efficiently. Amplifiers A1 and A2 could alternatively be two-quadrant multipliers. The differential outputs are necessary to provide one output as a color controlled input to the tint multiplier and the other as the output for summation of currents from the cross-coupled (tint) multipliers. The multipliers M1 and M2 are preferably four quadrant devices having current mode outputs for accomplishing the required summations.

In an embodiment shown in FIG. 5, a first color difference signal [B-Y] is fed as a first input to multipliers M1 and M3. A second color difference signal [R-Y] is fed as another first input to a second pair of multipliers M2 and M4. A control signal generator produces a pair of outputs comprising sin θ and cos θ from the original hue shift angle θ. Sin θ provides a second input to multipliers to M1 and M4, whereas cos θ provides a second input to multipliers M2 and M3: The outputs of multipliers M1 and M2 provide a first and second positive input, respectively, to adder A1 which produces a first modified color difference signal [R-Y]'. Similarly, the output from multiplier M3 provides a first positive input to adder A2, whereas the output from multiplier M4 provides a second, negative input to adder A2 which produces, as a result, a second modified color difference signal [B-Y]'. The modified color difference signals [R-Y]' and [B-Y]' replace the original color difference signals [R-Y] and [B-Y] in a video signal processing system to provide a tint controlled video signal. When employed in this fashion, the color chroma vector amplitude A remains at a substantially constant value over a wide range of hue shift angles θ.

The control signal generator in FIG. 5 produces control signals representing hue shift values that can be controlled, e.g., by a user-controlled tint control. For example, FIG. 5 shows a microprocessor (uP) coupled to the control signal generator via a data bus such as the well-known IIC or I2C data bus. The microprocessor receives and processes commands from a user-operated remote control. In a typical television system, in response to a user activation of a particular key of the remote control, the microprocessor will generate a graphics display signal that when coupled to a display device (not shown in FIG. 5) will produce, for example, a displayed menu (on-screen display or OSD) from which a user can select to control certain characteristics of the television system. One such characteristic is tint. After selecting tint control from the OSD menu, the user operates one or more keys of the remote control to vary the tint setting. The microprocessor detects the remote control signals indicating the tint modifications and generates the required control signals on the I2C bus to cause the control signal generator to generate control signals sinθ and cosθ that produce the desired tint modification.

The functions of the multipliers M1–M4, summers S1 and S2, adders A1 and A2 and the control voltage generator, can be realized using either analog or digital implementations. For example, in a digital implementation, the outputs for the control voltage generator can be generated from a ROM look-up table. In a fully digital system in which the color difference signals are digital data streams, digital multipliers can be used to multiply the color difference signals by the control signal values and digital adders can be used to combine the multiplier outputs to produce digital modified color difference signal data streams. If the color difference signals are analog and analog multipliers and adders are used, the ROM output can be converted to an analog value using a digital to analog converter (DAC). Alternatively, analog control signal generator outputs can be generated from DACs having input registers into which digital values representing the desired hue angle are loaded by the microprocessor via the I2C bus, e.g., the DAC input registers may be memory mapped registers. In an analog system, an implementation of a control signal generator that could provide approximations of the desired control signal values could be implemented using the non-linearity of transistor and diode junctions. Due to the relative complexity of the control function and the need for plural multipliers, it may be desirable to implement the described embodiments using one or more integrated circuits (IC).

While the invention has been described with reference to the embodiments described herein, it will be appreciated by those of ordinary skill in the art that modifications can be made to the structure and function of the invention without departing from the spirit and scope thereof.

TABLE 1

```
10 PI = 4 * ATM(1)
40 MAG = 1
50 ANGLE1 = 0
60 TintRangeDesired = 40
CLS
100 RY1 = MAG1 * SIN(ANGLE1 * PI / 180)
110 BY1 = MAG1 * COS(ANGLE1 * PI / 180)
120 MINDELTA1 = 100
130 FOR K1 = .5 / 45 TO .8 / 45 STEP .01 / 45 ◄
140 MINDELTA2 = 100
150 FOR K2 = .1 / 45 TO .7 / 45 STEP .01 / 45 ◄
160 MAXDELTA = 0
200 FOR THETA = -75 TO 75 STEP 5 ◄
210 RY2 = K1 * THETA * BY1 + (1 - K2 * ABS(THETA)) * RY1
220 BY2 = (1 - K2 * ABS(THETA)) * BY1 - K1 * THETA * RY1
230 MAG2 = SQR(RY2 * 2 + BY2 * 2)
235 IF BY2 = 0 THEN BY2 = 1E-19
240 ANGLE2 = (180 / PI) * ATN(RY2 / BY2)
245 IF ABS(ANGLE2) < 40 AND THETA = -75 THEN THETA = 75: DELTA = 1: GOTO 280
250 IF ABS(ANGLE2) > TintRangeDesired THEN GOTO 280
260 DELTA = ABS(ABS(MAG2) - 1)
270 IF DELTA > MAXDELTA THEN MAXDELTA = DELTA: KP1 = K1: KP2 = K2
280 NEXT THETA
300 IF (MAXDELTA < MINDELTA2) THEN MINDELTA2 = MAXDELTA: KM1 = KP1: KM2 = KP2
310 NEXT K2
400 IF MINDELTA2 < MINDELTA1 THEN MINDELTA1 = MINDELTA2: KL1 = KM1: KL2 = KM2
410 NEXT K1
500 PRINT
510 PRINT
520 PRINT "K1-OPT = "; KL1 * 45, "K2-OPT = "; KL2 * 45
530 END
```

What is claimed is:

1. Apparatus comprising:
a source of first and second color difference signals (B-Y, R-Y), said first and second color difference signals being associated with a color signal having an amplitude and a phase;
a signal processor (M1; M2; M3; M4; A1; A2) coupled to said source, said signal processor processing said first and second color difference signals to produce a phase shift ($\Theta$) of said color signal in response to a control signal; and
control means (Control Voltage Generator) for generating said control signal in response to a user command to change the hue of said color signal, characterized in that
said control means provides, as control signals, linear approximations of non-linear functions used to produce said phase shift whereby said signal processor produces an amount of phase shift in response to said linear approximations.

2. The apparatus of claim 1, characterized in that said linear approximations are associated with the values of sine $\Theta$ and cosine $\Theta$ wherein $\Theta$ corresponds to an amount of phase shift of said color signal.

3. The apparatus of claim 2, characterized in that said linear approximations approximate sine $\Theta$ as $K_1 \Theta$, and cosine $\Theta$ as $1-K_2 \Theta$, wherein $K_1$ is equal to about 0.78/45 and $K_2$ is equal to about 0.21/45.

4. The apparatus of claim 3, wherein the signal processor comprises first (M1), second (M2), third (M3), and fourth (M4) multipliers and first (A1) and second (A1) adders, said control means generating first and second control signals, said first color difference signal (B-Y) being provided to a first input of said first multiplier and to a first input of said third multiplier, said second color difference signal (R-Y) being provided to a first input of said second multiplier and to a first input of a fourth multiplier, said first control signal being provided to a second input of each of said first and fourth multipliers, said second control signal being provided to a second input of each of said second and third multipliers, an output of said first multiplier and an output of the second multiplier being coupled to respective inputs of said first adder for summing the outputs of the first and second multiplier for producing a first modified color difference signal, an output of said third multiplier and an output of said fourth multiplier being coupled to respective inputs of said second adder for subtracting the output of said fourth multiplier from the output of said third multiplier for producing a second modified color difference signal, said first and second modified color difference signals representing a color vector having said phase shift.

5. The apparatus of claim 4, wherein the control means generates said first and second control signals corresponding to sine $\Theta$ and cosine $\Theta$, respectively, to cause said signal processor to produce said phase shift.

6. The apparatus of claim 4, characterized in that said linear approximations approximate sine $\Theta$ as $K_1 \Theta$, and cosine $\Theta$ as $1-K_2 \Theta$ wherein $K_1$ is equal to about 0.78/45 and $K_2$ is equal to about 0.21/45.

7. The apparatus of claim 4, characterized in that said linear approximations are provided when said phase shift is in a range between about +/−30°.

8. The apparatus of claim 2, characterized in that said linear approximations are provided when said phase shift is in a range between about +/−30°.

* * * * *